UNITED STATES PATENT OFFICE.

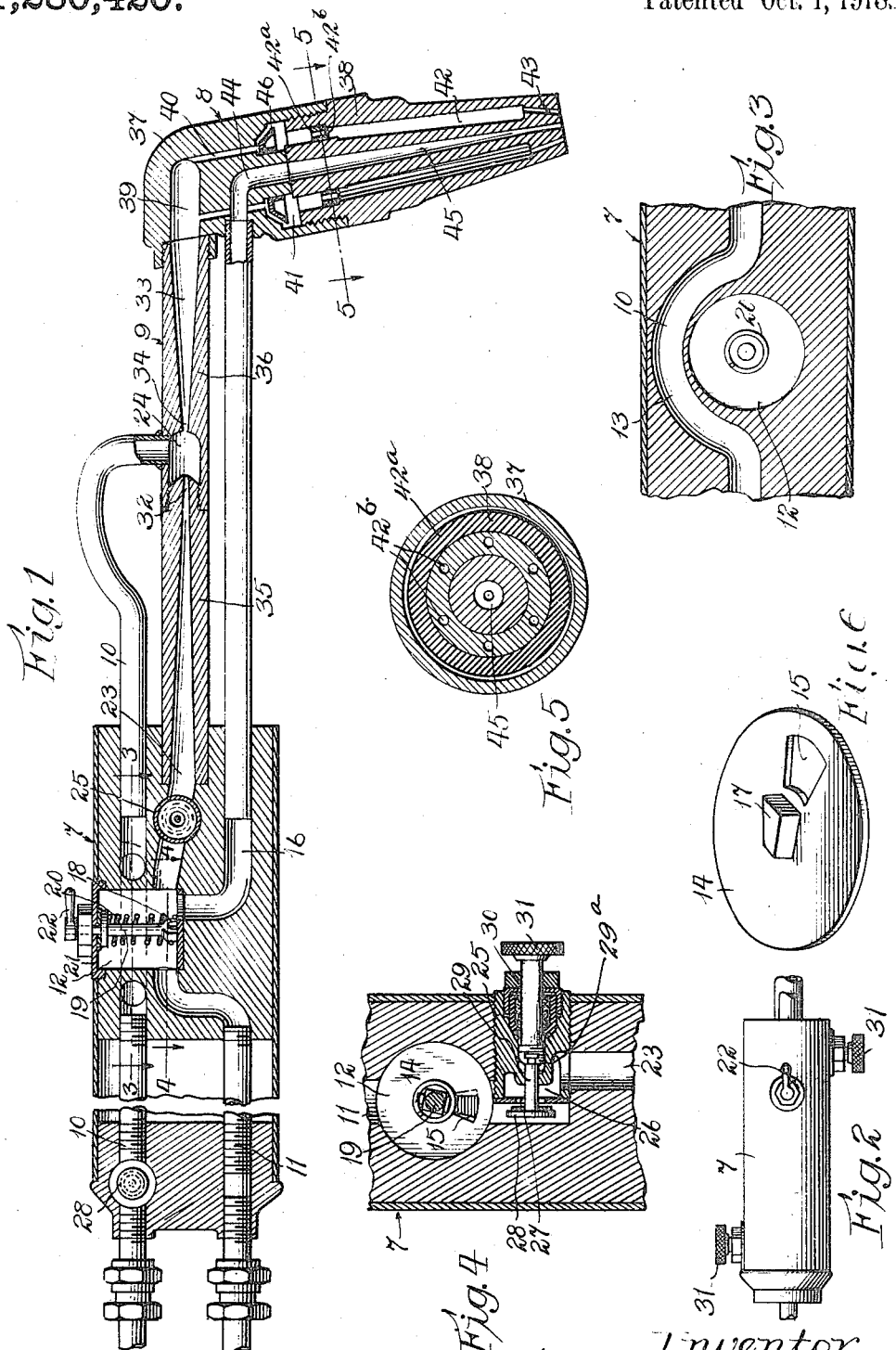

FRANK Y. DIBBLE, OF CHICAGO, ILLINOIS.

CUTTING-TORCH.

1,280,420.   Specification of Letters Patent.   Patented Oct. 1, 1918.

Application filed August 23, 1917. Serial No. 187,793.

*To all whom it may concern:*

Be it known that I, FRANK Y. DIBBLE, a citizen of the United States, residing at Chicago, in the county of Cook and State of Illinois, have invented certain new and useful Improvements in Cutting-Torches, of which the following is a specification.

The present invention relates to a torch used for the purpose of cutting metal, and is of the type commonly known as an oxygen acetylene cutting torch.

One of the objects of the present invention is to construct a torch in which an efficient commingling of oxygen and acetylene gas will be produced prior to the injection of the same into the nozzle for the preheating operation.

A further object of the invention is to pass a stream of oxygen into the mixing chamber from a restricted induction port, so that it acts in the manner of an injector to suck the acetylene into the mixing chamber.

A further object of the invention is to restrict the outlet from the mixing chamber so that the oxygen and acetylene are thoroughly mixed within said chamber.

A further object of the invention is to supply a duct communicating with a passage in the center of the nozzle through which a stream of oxygen may pass for the purpose of cutting.

A further object of the invention is to provide a valve control for the acetylene line, that portion of the oxygen line used during the preheating operation, and the oxygen line used during the cutting operation.

A further object of the invention is to provide a nozzle which is of simple and strong construction and is formed of one part, making it durable and easy to assemble and disassemble.

A further object of the invention is to provide a valve which will act in case of a back fire to prevent the back fire from extending into the body of the torch, or into the connections between the body and the acetylene supply tank.

A further object of the invention is to pass the preheating mixture through the nozzle in a number of fine streams, whereby the surface of the work to be cut is thoroughly and efficiently heated.

The invention further consists in the features of construction and combination of parts hereinafter described and claimed.

In the drawings:

Figure 1 is a longitudinal section through the torch of the present invention;

Fig. 2, a plan view of the body of the torch, showing the relative positions of the valve actuating members;

Fig. 3, a cross section on line 3—3 of Fig. 1;

Fig. 4, a cross section on line 4—4 of Fig. 1;

Fig. 5, a cross section on line 5—5 of Fig. 1; and

Fig. 6, a perspective detail of the valve controlling the oxygen cutting line.

Referring now to the drawings, the device comprises a body given the general numeral 7, a nozzle given the general numeral 8, and a connection between the body and nozzle given the general numeral 9. The body may be of any suitable size and formation, and extending therethrough is a conduit 10 forming a portion of the acetylene line, and a conduit 11 forming a portion of the oxygen line.

Formed within the body 7 is a chamber 12, and the acetylene line is bent as at 13 (see Fig. 3) to extend outside of said chamber. Located within the chamber is a flat disk 14 having therein an opening 15, which, when the disk is turned to proper position, will establish communication between the chamber and the conduit, forming an oxygen cutting line 16. The disk is formed with a lug or protuberance 17, which is embraced by the forked end 18 of a stem 19. Surrounding this stem is a spring 20 bearing against the disk 14 and holding the same in place at the lower end of the chamber 12. This spring holds the valve against its seat and prevents leakage of the valve in ordinary use. The chamber is closed at its upper end by means of a suitable cap 21, and the rod 19 extends through said cap, and at its outer end has connected thereto a hand-piece 22, which lies to the outside of the body. The use of this valve in operating the torch will be hereinafter explained.

The acetylene line 10 and that portion of the oxygen line 23 which leads to a mixing chamber 24 are controlled by valves, one of which is shown more in detail in Fig. 4 and consists of a plug 25 entered into the body. This plug is formed with a chamber 26, having an opening 27 closed by means of a suitable disk 28, attached to a stem 29, which stem is grooved adjacent its end to receive bent prongs 29ª extending from a stem 30, threaded adjacent one end; and a finger-piece 31 is secured adjacent its other end. As stated, the valves for both the acetylene and oxygen preheating lines are of the same character; and, as shown, the finger-pieces 31 extend to the outside of the body (see Fig. 2), so that they are readily accessible for operation.

The acetylene line terminates in the mixing chamber 24, and, as shown, the line enters at the upper side of the chamber. The oxygen preheating line 23 also communicates with this chamber, and, as will be apparent from the drawings, the induction end of this oxygen line is throttled as at 32, so that the oxygen under pressure entering into said chamber acts in the manner of an injector, to suck or draw acetylene thereinto.

The mixture eduction passage 33 leading from the mixing chamber is restricted as at 34, at its point of communication with said chamber. This results in a throttling of the outflow of the mixture, with the result that the oxygen and acetylene are thoroughly mixed up before passing out from the chamber.

The connecting portion 9, in which is formed the mixing chamber, together with the oxygen preheating line and the mixture eduction passage, is formed of two parts 35 and 36, and, as will be apparent from the drawings, the formation of these parts to produce the mixing chamber and the restricted portions of the various passages is a simple manufacturing proposition. The connection of these parts is such as to enable them to be very quickly assembled or taken apart for the purpose of repair. There are relatively few joints, and these are of such nature as to enable them to be constructed in a manner to efficiently hold against leakage.

The nozzle 8 comprises a bend or coupling portion 37, and the tapered nozzle tip 38. The bend is formed with a chamber 39, from which extends a plurality of passages 40. These latter communicate with a chamber 41 in the lower end of the bend, and leading from the chamber 41 is a chamber 42 communicating with a series of relatively small outlets 43. A plug 42ª is inserted in the upper portion of the nozzle tipped chamber 42, which plug contains a series of passages 42ᵇ. These passages serve to further mix the gases as they flow from the chamber 41 to the chamber 42, and also act as a restriction to create a pressure on the gases entering the chamber 42.

In the preheating of the work previous to the cutting, the mixture passes from the chamber 39 into the passages 40, thence into the chamber 41, through the passages 42ᵇ, into the chamber 42 and out through the openings 43. The oxygen cutting line 16 communicates with a passage 44 in the bend, which in turn communicates with a tapered passage 45 in the nozzle.

As is well understood in the art, the work is first heated by means of the acetylene and oxygen mixture, and the cutting is done by turning the stream of oxygen upon the preheated work. When the preheating is being performed, the valve 14 is turned so that the opening 15 is out of communication with the oxygen cutting line 16. After the preheating has been completed, the valve is turned into the position of Fig. 1, and the oxygen then flows through the oxygen cutting line and out through the passage 45 to perform the cutting operation.

It frequently happens in the use of these torches that through an overheating or some other abnormal condition, a back fire is produced. If this is allowed to enter into the body of the torch, it results in a burning out of the parts, rendering the torch unfit for further use and liable to suddenly burst forth from the body, thus endangering the operator. To prevent this back fire, which originates in the nozzle, from passing back and into the body of the torch, I provide a valve 46, which, under the force of a back-pressure in the nozzle, will move into position to close the ports or passages 40 and prevent the back fire from passing rearwardly into the body of the torch.

The structure is of course susceptible of changes and modifications from the form shown in the drawings and specifically herein described, without departing from the spirit of the present invention, and is only deemed to be limited by the terms of the claims appended hereto.

I claim:

1. In a cutting torch, the combination of a body, a nozzle, a connection between the body and nozzle, a mixing chamber in said connection, an oxygen line and an acetylene line communicating with said mixing chamber, a line for cutting oxygen communicating with the nozzle, said body being formed with a chamber interposed in said oxygen line, a valve in said body chamber in the form of a spring-pressed flat disk seating on the lower face thereof, said cutting oxygen line communicating with said chamber through the lower face of said chamber, exterior means for turning said disk, said disk being arranged whereby when turned into one position oxygen will flow through said chamber and into the mixing chamber, and when turned into another position the oxygen will flow from said chamber into the oxygen cutting line, substantially as described.

2. In a cutting torch, the combination of a nozzle, a body, a conduit extending between the body and nozzle consisting of two pipe sections joined together, an oxygen line through the body communicating with one pipe section, said section having a restricted opening at its outer end, an acetylene line passing through said body and communicating with the second pipe section at a point adjacent its point of juncture with the first pipe section, said second pipe section having an enlarged recess at its joined end to form a chamber with which said acetylene line communicates, and said second pipe section being restricted adjacent its cut-away portion to retard the passage of gases out of said chamber and causing a mixing thereof, said restriction of the first pipe section acting as a jet to draw the acetylene into the chamber, a cutting oxygen line communicating with the nozzle, and valvular means for controlling said lines, substantially as described.

3. In a cutting torch, the combination of a body, an acetylene passage and an oxygen passage through the body, a nozzle, a pipe-like member extending between the body and nozzle, the passage through said pipe-like member being enlarged at a point medially thereof to provide a chamber, and said passage being restricted at both points of communication with said chamber to provide a restricted inlet thereinto and a restricted outlet therefrom, said body oxygen passage communicating with the body end of said pipe-like member, a conduit extending from said body acetylene passage and running exteriorly of the pipe-like member to a point in alinement with said chamber, and thence extending through the walls of said pipe-like member to communicate with said chamber at a point medially therein, whereby the oxygen coming through said restricted inlet to said chamber acts as a jet to draw the acetylene into said chamber, and said restricted outlet serving to check the passage of said oxygen and acetylene mixture out of said chamber to thoroughly mix them, a cutting oxygen line communicating with said nozzle, and valvular controls for all of said oxygen and acetylene lines and passages, substantially as described.

F. Y. DIBBLE.